United States Patent [19]

Dembecki

[11] 4,313,964

[45] Feb. 2, 1982

[54] APPARATUS AND METHOD FOR PRODUCING EDIBLE FOOD FILLABLE CONES

[75] Inventor: Stanley L. Dembecki, Phoenix, Ariz.

[73] Assignee: Silver Cloud Enterprises, Inc., Phoenix, Ariz.

[21] Appl. No.: 75,111

[22] Filed: Sep. 13, 1979

Related U.S. Application Data

[63] Continuation of Ser. No. 854,731, Nov. 25, 1977, abandoned.

[51] Int. Cl.³ .............................................. A21D 5/08
[52] U.S. Cl. .................................... 426/138; 426/139; 426/512; 426/514; 426/523; 426/499; 426/549; 426/439
[58] Field of Search ................. 426/89, 138, 512, 139, 426/143, 523, 514, 553, 551, 499, 549; 99/426, 383, 416

[56] References Cited

U.S. PATENT DOCUMENTS

| | | | |
|---|---|---|---|
| 2,244,193 | 6/1941 | Guyon et al. | 426/523 |
| 2,473,402 | 6/1949 | Wood | 99/383 |
| 2,749,853 | 6/1956 | Graham | 99/383 |
| 3,290,154 | 12/1966 | Turner | 426/138 |
| 3,410,691 | 11/1968 | Stanley | 426/138 |
| 3,537,389 | 11/1970 | Villarreal | 99/426 |
| 3,541,587 | 11/1970 | Washburn | 426/138 |
| 3,653,337 | 4/1972 | Hanson | 99/426 |
| 3,910,548 | 10/1975 | Giesfeldt | 426/514 |

*Primary Examiner*—Jeanette M. Hunter
*Attorney, Agent, or Firm*—Cahill, Sutton & Thomas

[57] ABSTRACT

Male and female cone-shaped molds are brought into locking engagement with one another to force a quantity of dough deposited upon the upper portion of the male mold throughout a cone-shaped cavity defined by the molds. After seating of the female mold upon the male mold, a lock mechanism maintains the molds coupled as a mold unit during cooking of the dough, whether the cooking is by immersion of the mold unit within hot oil. Relief ports are included in the mold unit to accommodate expansion of the dough and/or gases. The resulting edible cone is fillable with a food substance to serve as an edible container for the food substance. A process for manufacturing the edible cone is also described.

6 Claims, 7 Drawing Figures

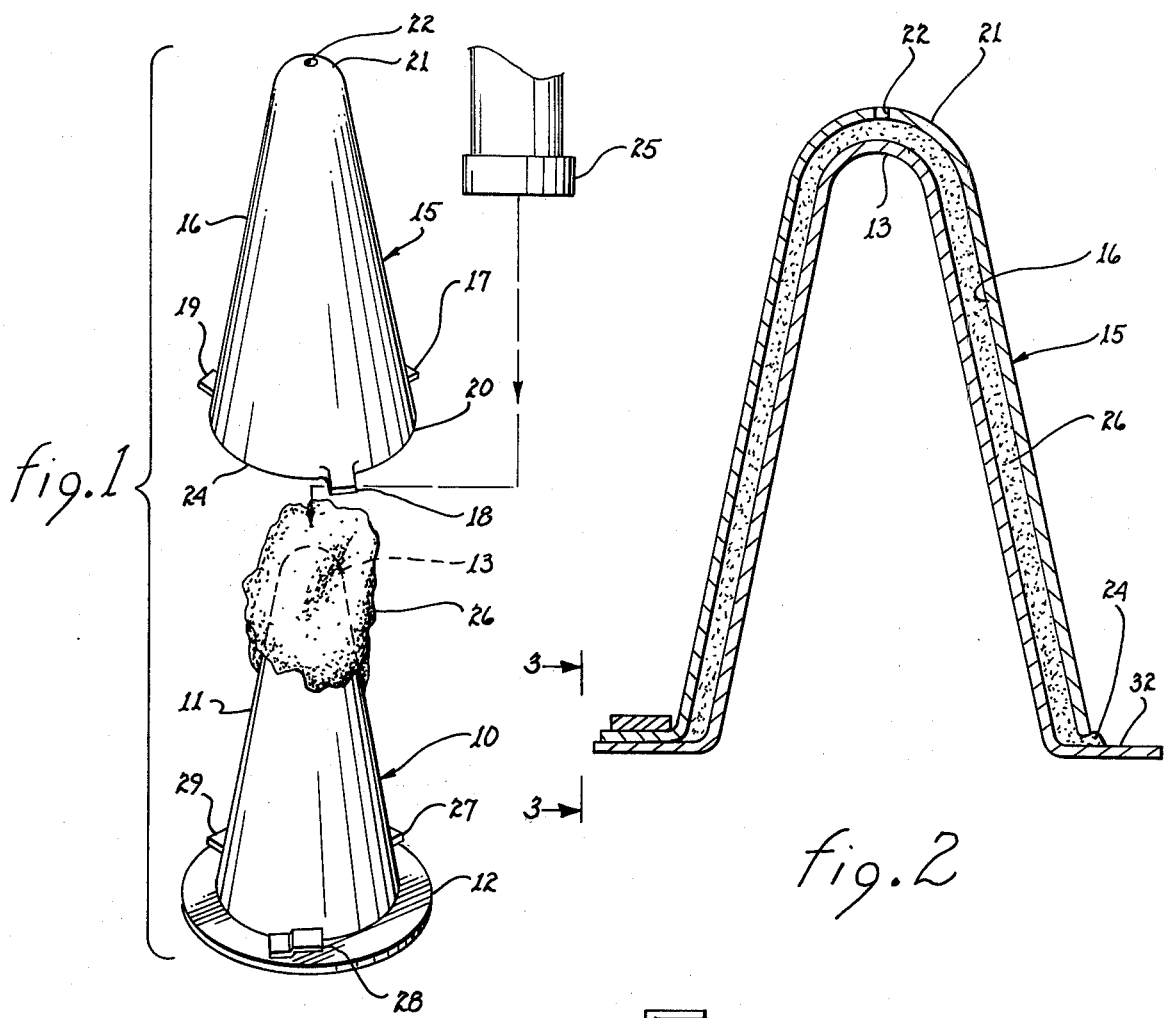
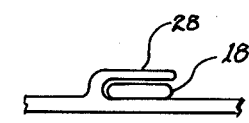
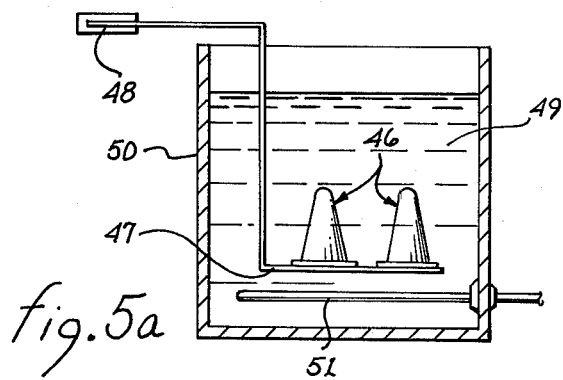
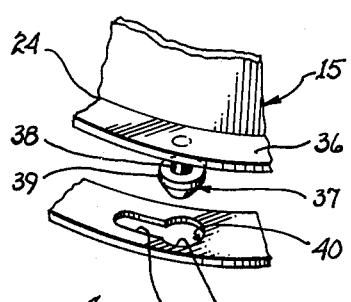
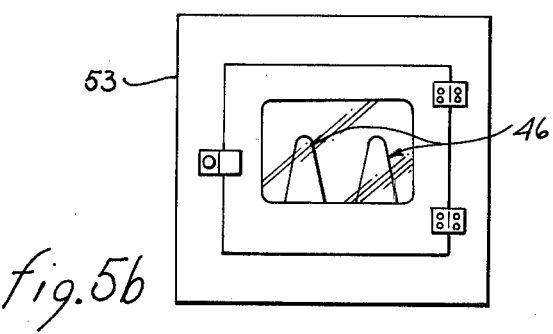

APPARATUS AND METHOD FOR PRODUCING EDIBLE FOOD FILLABLE CONES

This is a continuation of application, Ser. No. 854,731, filed Nov. 25, 1977 now abandoned.

The present invention relates to apparatus and a process for preparing edible products and, more particularly, to apparatus and a process for preparing edible food fillable cones.

Cone shaped edible food containers are not, per se, novel. In example, U.S. Pat. No. 839,488 describes apparatus for making ice cream cones. Herein, a core piece is dipped into batter to establish a thin coating thereof upon the core piece. The core piece is placed within a pair of hinged female molds and the unit is subjected to heat. The steam pressure generated during cooking is relieved by spring loaded axial displacement of the core piece. In U.S. Pat. No. 913,597, an edible cone is developed by wrapping a waffle about a male cone shaped mold and the wrapped waffle is enclosed within a female cone shaped mold. After cooking the formed cone shaped waffle is discharged from the molds. U.S. Pat. No. 3,424,076 is directed to the formation of a cone shaped edible container from a preformed uncooked circular tortilla. The tortilla is wrapped about a cone shaped open framework male mold and inserted within a cone shaped open framework female mold. The unit, as a whole, is deposited within hot oil to fry the tortilla and produce a relatively stiff cone shaped container having overlapping lateral edges. U.S. Pat. No. 3,604,342 describes a further mold for retaining an uncooked tortilla in a cone shape while frying the tortilla. The end product is a cone shaped tortilla having overlapping sides. Other U.S. patents directed to various apparatus and processes for forming edible food containers include U.S. Pat. Nos. 2,506,305; 2,545,897; 2,570,374; 2,627,222; 2,664,812; 2,957,405; 3,555,993 and 3,759,165.

Presently, fast food establishments serve a multitude of meat and non-meat food substances deposited within or formed as an integral part of an edible container or enclosure. The most common examples include the hamburger, the hotdog and the ice cream cone. Other food stuff, such as tacos, burritos, etc., also include a bread type container. In all of these, except for the ice cream cone, the sauces and other liquids attendant the contained food substance will drip and a napkin or serviette is essential to prevent soiling of one's clothes. The ice cream cone, generally made of a flour sugar base, is unsuitable, from a taste standpoint, for use with food substances other than ice cream.

Except for hamburger and hot dog buns, and ice cream cones, the other edible containers require working of the batter or dough into sheet form, cutting of the sheet to a predetermined shape and then placing the cut sheets into frames or the like to fry or bake them. Several devices for supporting the cut sheets during cooking are described in the above-identified patents. Hamburger and hot dog buns are manufactured by conventional mass production baking techniques. The ice cream cones are manufactured by coating a male mold with confection batter and cooking the coated male mold within a female mold; this process is also described in the above-identified prior art.

In the preferred embodiment of the present invention, a cone shaped male mold lockingly engages with a cone shaped female mold to define a mold unit having a cone-shaped cavity disposed therein. A quantity or batch of dough, commensurate with the volume of the cone-shaped cavity, is deposited upon the upper portion of the male mold. Alternately, the batch of dough may be deposited within the female mold. On engagement of the male mold with the female mold, the dough is forced to permeate throughout the cone-shaped cavity. Relief holes are provided to accommodate excess dough, expansion of the dough during cooking and relieve any gas pressure build up during cooking. The mold unit, containing the dough, is immersed within hot cooking oil to cook the dough by the transmission of heat through the male and female molds; alternatively, the mold unit may be placed within a radio frequency oven or within a conventional oven the cook the dough. After the dough has been cooked, the molds are unlocked to release the edible cone, whereafter the edible cone may be filled with any food substance.

Corn meal based dough, being somewhat less malleable than conventional grain based dough, is particularly well suited for use in the present invention as the process of mating the female mold with the male mold provides the requisite force to insure sufficient flow of dough throughout the cone-shaped cavity. Furthermore, corn based cones are particularly suited in both taste and structural rigidity to serve as containers for a wide range of food substances.

It is therefore a primary object of the present invention to provide a mold unit for producing edible cone-shaped containers for food substances from a batch of dough.

Another object of the present invention is to provide mold unit for converting a batch of dough directly into a cone shaped product without any intermediate dough handling steps.

Still another object of the present invention is to provide a mold for producing a cone shaped product from dough by transferring heat through the mold to the dough.

Yet another object of the present invention is to provide automatable apparatus for converting dough into a plurality of cooked edible cone-shaped food containers.

A further object of the present invention is to provide a process for making cone-shaped edible food containers.

A still further object of the present invention is to provide a process for transforming any type of dough into edible cone-shaped food containers.

A yet further object of the present invention is to provide an automated process for developing cone-shaped edible containers from dough.

These and other object of the present invention will become apparent to those skilled in the art as the description thereof proceeds.

The present invention may be described with greater specificity and clarity with reference to the following drawings, in which:

FIG. 1 is an exploded view of the molds forming a mold unit.

FIG. 2 is a cross sectional view of the molds in locking engagement with one another.

FIG. 3 is an end view of the locking mechanism taken along lines 3—3 as shown in FIG. 2.

FIG. 4 is a variant of the lock mechanism illustrated in FIG. 4.

FIGS. 5A and 5B illustrate alternate methods for applying heat to the mold unit.

Figure 6:
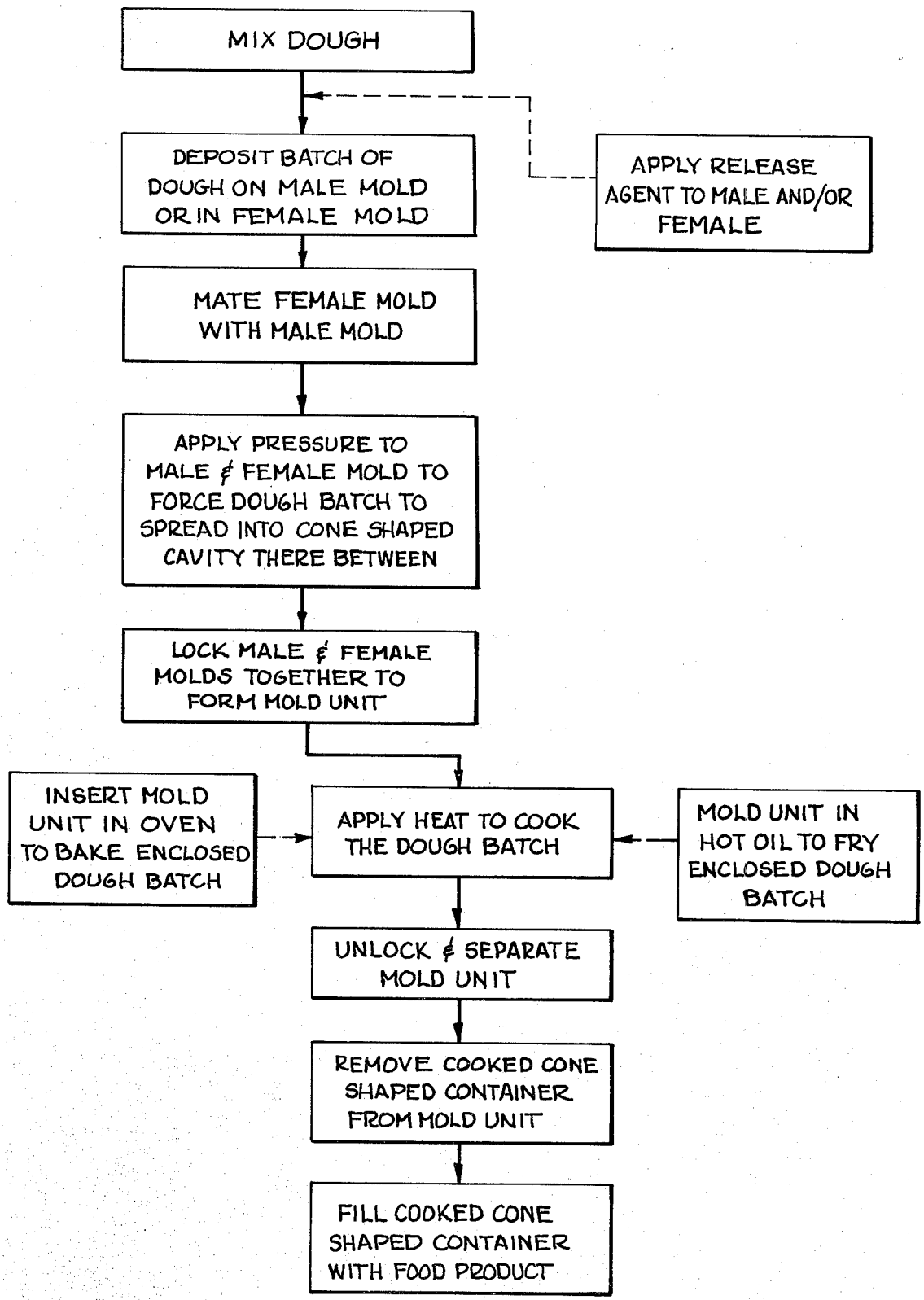
FIG. 6 is a flow diagram illustrating a process for producing an edible cone-shaped container.

Referring to FIG. 1, the basic structure and interrelationship of the molds forming a mold unit to produce an edible cone-shaped container will be described. A cone-shaped male mold 10 includes a cone-shaped element 11 terminated by an annular flange 12. Tip 13 of the cone-shaped element is rounded, rather than pointed, for both manufacturing reasons associated with the mold and structural reasons associated with the cone-shaped end product produced by the mold. Female mold 15 includes a hollow cone-shaped element 16 and a plurality of laterally extending tabs 17, 18, and 19 disposed in proximity to open end 20 of the mold. Tip 21 is rounded in correspondence with tip 13 of the male mold and includes an aperture 22 disposed therein. The external dimensions of cone-shaped element 11 are reduced with respect to the corresponding dimensions of cone-shaped element 16 such that on mating of the female mold with the male mold, the cavity therebetween defines the cross-sectional dimensions of the cone-shaped product to be formed.

A dough dispensing unit 25 is ancillary to male and female molds 10 and 15. The dough dispensing unit may be automated to dispense a predetermined quantity or batch of dough from a hopper or the like; alternatively, it may be simply a source of dough from which a quantity of dough is removed. In either event, unit 25 provides a source from which dough may be used in conjunction with the male and female molds to develop and cook a cone-shaped edible product.

In operations, a quantity or batch of dough 26 is dispensed from or obtained from dough dispensing unit 25 and is placed upon tip 13 of the male mold 10. On insertion of the male mold within the female mold, or alternatively, on forcing of the female mold upon the male mold, dough 26 is forced to permeate within cavity 23 defined by cone-shaped element 11 and cone-shaped element 16, as illustrated more clearly in FIG. 2.

The degree of force necessary to mate the male and female molds depends upon the degree of malleability of the dough. It has been learned thru experimentation that the compressive force necessary varies between ten to fifteen pounds. On mating of the two molds, tabs 17, 18 and 19 are lockingly engaged with the respective ones of retainers 27, 28 and 29, as shown in FIGS. 2 and 3. These retainers are attached to flange 12 and dimensioned to snugly receive the respective one of the tabs. Thereby, displacement of the female mold with respect to the male mold along longitudinal axis of the molds is prevented.

On locking engagement of the male and female molds, the edge of end 20 of cone-shaped element 16 is at least partially raised or displaced from upper surface 32 of flange 12 such that the space therebetween exists, as shown in FIG. 2. This space accommodates overflow of dough 26. Additionally, the space provides relief for expansion of the dough during cooking and relief for steam and/or gases generated during application of heat to the dough. Aperture 22 disposed in tip 21 serves a similar purpose in that it allows escape of excess dough as well as relief from steam and/or gases generated during cooking of the dough. The axial location of female mold with respect to male mold 10 may be effected by the bottom surface of the lugs, such as surface 33 of lug 18, bearing against surface 32 of flange 12. Alternatively, edge 24 at end 20 may be non-linear to accommodate both positioning functions of the female mold with respect to the male mold and provide passageways for the dough and gases.

A variant of the male and female mold locking mechanism is illustrated in FIG. 4. Herein, edge 24 of female mold 15 may include an annular flange 36 for supporting keys, such as key 37. Alternatively, flange 36 may be sectioned with each section supporting a key. Key 37 includes a downwardly extending shaft 38 terminating at a larger diameter head 39. The key lockingly mates with a keyhole 40 having a bulbous end 41 for penetrably receiving head 39 and a channel 42 for receiving shaft 38. Thus, upon penetrable insertion of key 37 within keyhole 40 and subsequent rotational displacement of the female mold with respect to the male mold, channel 42 will bear against the upper surface of head 39 and preclude axial displacement of the female mold from the male mold. It may be noted that the locking mechanisms described in both FIGS. 3 and 4 are engageable by slight twisting of the female mold with respect to the male mold, such twisting can be readily performed manually or thru automated processes.

Presently, experimental mold units have been developed from stainless steel. This material works admirably well from the standpoint of heat transfer to the contained dough, flow of dough intermediate the molds and release of the cooked product therefrom. However, many of the presently available man-made plastics could also be employed provided they are constructed to have the requisite structural integrity to withstand the pressures necessary to form the dough into a cone-shaped configuration and provided further, that the heat transfer characteristic of the plastic is sufficient to supply an adequate quantity of heat at a desired temperature to the dough.

The process of applying heat to the mold unit to cook the dough will be described with reference to FIG. 5A. After the dough has been formed into a cone-shape by locking engagement of female mold 15 with male mold 10, the resulting mold unit 46 may be placed upon a tray 47 having a handle 48 extending therefrom. The tray, containing mold unit(s) 46 is thereafter immersed within hot cooking oil 49 in vat 50. A heating element 51 disposed within vat 50 maintains the temperature of the cooking oil at or within a predetermined temperature range. The heating element may be of the immersible type or it may be formed as part of the structure of vat 50, as is well known to those skilled in the art. After a predetermined cooking period, tray 47 is removed from the cooking oil and each mold unit 46 is opened. Upon opening of the mold unit by twisting the female mold with respect to the male mold and withdrawing the male mold, the cooked cone shaped product may drop out by itself or may be pulled out.

FIG. 5B illustrates an alternate method of cooking dough 26 within mold units 46. That is, the mold units may be placed within an oven 53 and baked for a predetermined time period at or within a predetermined temperature range.

FIG. 6 is a flow diagram illustrating the various steps necessary to produce a cone-shaped edible container from a batch of dough. Additionally, several ancillary steps are also illustrated. These ancillary steps are identified by the dashed laterally extending arrows.

The step of mixing the dough may include the use of a variety of flours, depending upon the type and nature of the food substance which is to be placed within the final product. In example, flour such as self rising flour, white enriched flour, rye flour, rice flour, or flour sold under the trademarks Bisquick, Wondraquick Mixing Enriched Flour, Masa Trigo and Masa Harina. The selection of flour should be predicated upon the type of food substance to be placed within the cone shaped container such that the taste of the cone shaped container will complement the food substance. In example, ½ cup of Masa Trigo flour, ½ cup of Masa Harina flour mixed with ½ cup of water makes a dough, which when fried, tastes very good with Mexican-type foods such as taco filling, tostada filling and bean tortilla filling. A dough of one-half cup of buttermilk Bisquick flour, mixed with ⅓ cup of water provides a complementary flavor when the container is used for chicken, turkey, ham and cheese and tuna fish, a dough of ⅓ cup Bisquick flour, ⅓ cup of wheat flour, ¼ cup of rice flour and approximately ⅓ cup of water, is preferrable. Many other doughs can, of course, be mixed and used with the above-described mold units for cooking cone-shaped edible containers.

It has been found that the average cooking time of the above-identified types of dough in pure vegetable oil is about four to six minutes at a temperature range of 350° F.–375° F. With adequate temperature controls, the best results are achieved if the temperature range is maintained within 365° F.–372° F.

It is to be understood that in addition to the above recipes for dough, other ingredients, such as baking powder, salt, corn starch, sugar and dried oregano may be added.

Because there exists no limitations on the type and flavor of dough employable in the present invention, the resulting cone-shaped edible container may be filled with Mexican taco filling, Mexican tostado filling, pasta, spaghetti and meat sauce, Oriental type fillings, Polish type fillings, chili beans, hamburger and cheese (sloppy joe type), chicken salad, turkey salad, ham salad, tuna fish salad and many more.

Although the flow chart of FIG. 6 is essentially self-explanatory, additional comments may be appropriate with respect to certain of the steps.

Prior to the deposition of dough within the male and female molds, the respective cone-shaped elements may be coated with a release agent to facilitate removal of the cooked cone shaped container therefrom. The application of a release agent may not be necessary where the surfaces of the cone-shaped elements coated with one of the presently available low friction coatings.

The final step depicted in FIG. 6 is not, of course, necessary to the production of the cone-shaped edible container but this step is included to indicate the possibility of producing filled edible cone-shaped containers as part of a continuous production process.

Use of the present invention for production of cone-shaped edible food containers in commercial quantities is anticipated. To obtain a commercial production rate, it will be necessary to automate, by mass production techniques, the manufacturing process. To achieve this end, various modifications to the above-described apparatus are contemplated.

First, sufficient dough from a predetermined recipe must be mixed or continually mixed and fed into a hopper. From the hopper, a discharge unit (like unit 25 of FIG. 1) force feeds onto each male mold (or into each female mold) a measured quantity of dough. This feed process may be direct or through a transfer unit. The respective ones of the male and female molds are mated with one another to force the deposited dough into the cone-shaped cavity within each mold unit. A locking mechanism or a continuing force maintains the male and female molds mated during cooking of the dough. After engagement of the locking mechanism, if used, the mold units are transferred to a cooking unit, such as a radio frequency oven. Cooking by this method may reduce the cooking time to a period of between five and ten seconds. Upon removal of the mold units from the oven, the male and female molds are separated. Depending upon special configurations attendant the male or the female molds, the cooked cone-shaped containers can be urged to remain with either the male or the female mold upon separation. An ejector mechanism associated with either the male or female mold retaining the container, is energized to dislodge the cooked container from the respective mold. On removal from the mold, the container can be conveyed to a collection point for stacking with other containers; alternatively, it can be conveyed directly to further apparatus for filling each container with a predetermined food substance.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A cone shaped edible container having an apex rounded in three dimensions for containing food substances, said container being produced by a process comprising the steps of:
   (a) mixing a quantity of malleable dough;
   (b) depositing a batch of the dough in a three dimensionally rounded apex of a cone shaped cavity, which cavity is defined by a male and female mold constructed of heat transmissive and impermeable material to shield the dough from direct contact with a source of heat and still subject the dough to heat from the source of heat;
   (c) forcing the male and female molds into a mating relationship to forceably disperse the dough from the apex and into the confines of the cone shaped cavity to define the interior and exterior walls of said container;
   (d) locking the male and female molds in a mated relationship to preclude the forces present during rapid cooking and curing of the dough from displacing the male and female molds from one another along the longitudinal axis of the cone shaped cavity;
   (e) applying heat by conduction to the mated male and female molds from the source of heat to cook and cure the deposited dough rapidly and develop the container in no more than six (6) minutes by immersing the mated male and female molds in a cooking oil heated to a temperature in a range 350°–425° F.;
   (f) relieving pressure build up within the cone shaped cavity resulting from the rapidly curing dough through a port located at the apex of the cone shaped cavity and commensurate with the point of deposition of the dough;
   (g) removing the mated male and female molds from the cooking oil; and
   (h) withdrawing said container from within the male and female molds.

2. The container as set forth in claim 1 wherein the temperature of the liquid medium during said step of applying heat is in the range of 375°–400° F.

3. The container as set forth in claim 2 wherein the temperature of the liquid medium during said step of applying heat is in the range of 375°–380° F. and wherein the duration of said step of applying heat is in the range of 4–6 minutes.

4. A process for making an edible cone shaped container having an apex rounded in three dimensions for food substances, said process comprising the steps of:

(a) depositing a batch of malleable dough at the apex and intermediate a male and female mold of heat transmissive and impermeable material to shield the dough from direct contact with a source of heat and still subject the dough to heat from the source of heat, each mold having a cone shaped element and which molds, in concert, define a cone shaped cavity having its apex rounded in three dimensions;

(b) mating the male and female molds to disperse the dough from the apex and into the cone shaped cavity and to define the interior and exterior walls of the container;

(c) locking the male and female molds in a mated relationship to preclude the forces present during rapid cooking and curing of the dough from displacing the male and female molds from one another along the longitudinal axis of the cone shaped cavity;

(d) applying heat by conduction to the dough dispersed within the cone shaped cavity to cook and cure the dough rapidly and develop the container in no more than six (6) minutes by immersing the mated male and female molds in a cooking oil heated to a temperature in the range of 350°–425° F.;

(e) relieving pressure build up within the cone shaped cavity resulting from the rapidly curing dough through a port located at the apex of the cone shaped cavity and commensurate with the point of deposition of the dough;

(f) maintaining the male and female molds in a mated relationship during immersion of the male and female molds in the heated liquid medium;

(g) removing the mated male and female molds from the cooking oil; and (h) releasing the container from the male and female molds.

5. The process as set forth in claim 4 wherein the temperature of the liquid medium during said step of applying heat is in the range of 375°–400° F.

6. The process as set forth in claim 5 wherein the temperature of the liquid during said step of applying heat is in the range of 375°–380° F. and wherein the duration of said step of applying heat is in the range of 4–6 minutes.

* * * * *